UNITED STATES PATENT OFFICE.

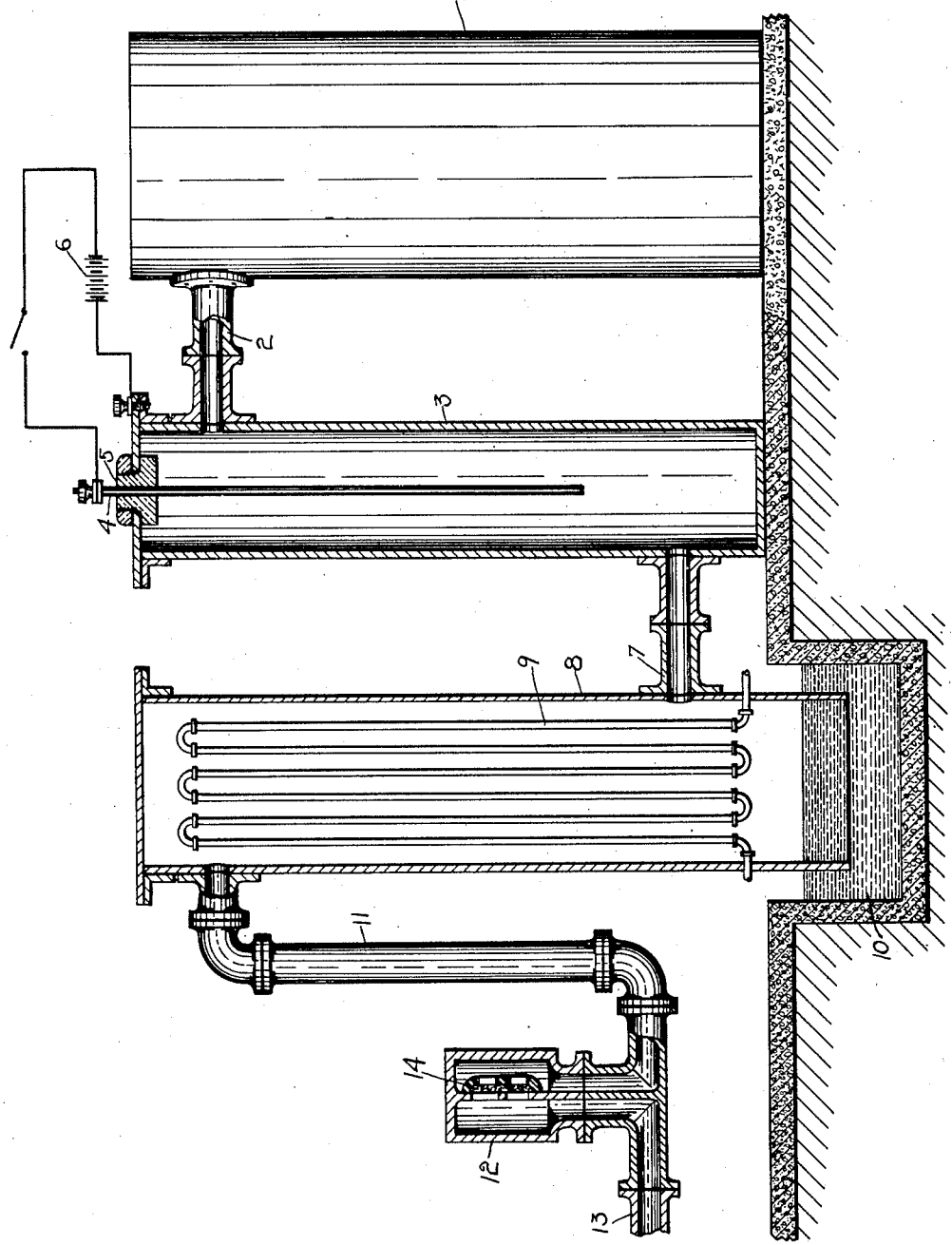

HARRY F. SMITH, OF LEXINGTON, OHIO, ASSIGNOR TO THE SMITH GAS ENGINEERING COMPANY, A CORPORATION OF OHIO.

GAS PURIFICATION.

1,358,030.        Specification of Letters Patent.        Patented Nov. 9, 1920.

Application filed August 4, 1917. Serial No. 184,455.

*To all whom it may concern:*

Be it known that I, HARRY F. SMITH, a citizen of the United States of America, residing at Lexington, Richland county, Ohio, have invented certain new and useful Improvements in Gas Purification, of which the following is a full, clear, and exact description.

This invention relates to gas purification and more particularly to the removal of vapors from gases, such, for instance, as the tar vapor which is found in producer gas. The object of the invention is to provide an effective process for removing vapors from gases which is at the same time sufficiently simple and easy of operation to permit of its practical use.

In the removal of vapors from gases probably the simplest method of procedure is to subject the vapor containing gas to a cooling action sufficient to lower the temperature of the gas and the vapor which it contains to such a point that condensation of the vapor into a liquid results with an ensuing precipitation of this liquid. In some cases, however, it has been found that thus lowering the temperature below the condensation point does not bring about a precipitation of the condensed vapor because of the particles of liquid formed being so small as to constitute a fog which remains suspended in the gas and does not readily yield to attempts to remove it by precipitation or otherwise. It has been found that in order to condense vapors into liquid there must be present nuclei upon which the liquid may collect as it is formed. In other words for a vapor to condense it must have something upon which to condense, condensation nuclei, as I call them. Naturally the number of liquid particles formed upon cooling of the gas sufficiently to bring about condensation will depend upon the number of nuclei and the size of the individual particles will be governed by the quantity of vaporized materials to be condensed upon each. It is evident, therefore, that the cause of the fog formation, in cases such as mentioned above, is the existence in the gas of a comparatively great number of condensation nuclei. Consequently if the number of condensation nuclei in the gas be materially reduced the size of the resulting condensation particles will be correspondingly increased and, of course, the larger the particles thus formed the more readily they may be removed by precipitation or otherwise. This invention is especially adapted to remove tar vapors from producer gas, although it is quite obviously capable of numerous other adaptations.

In the treatment of producer gas to remove the tar therefrom it has been found that cooling of the gas gives rise to a very finely divided tar fog which is extremely difficult of removal. The cause of this condition is as follows:—

Whenever carbon is raised to incandescence it gives off great quantities of ions, electrons or electrically charged particles. These readily act as condensation nuclei and since the number of them is comparatively great the tar particles condensed thereon are extremely small so that they constitute a finely divided fog suspended in the gas which yields very reluctantly to the generally practised expedients tending to remove it. In carrying out my method of elimination I subject the heated tar carrying gas to a deionizing action before its temperature has been lowered sufficiently to allow of condensation of the vapors therein and then lower the temperature so as to bring about condensation of the contained vapors into liquid. In this way the number of liquid particles formed is considerably lessened and at the same time the size of these particles is considerably increased, so much so, in fact, that many of the particles will settle out through gravity while the others may be readily removed by means of any desired separating apparatus.

For carrying this method into effect I make use of the apparatus disclosed in the accompanying drawing, which is shown partly in elevation and partly in section in order to more clearly illustrate the structure and operation thereof.

In the drawing 1 designates any conventional gas producer having an off take pipe 2 through which the gas generated is led away. This offtake 2 opens into a treating chamber 3 in which the gas is maintained at a temperature above the condensation point of the tar or other vapors carried thereby. In the chamber 3 is an electrode 4 which passes through the top wall thereof and is insulated therefrom in any desired manner as shown generally at 5. This electrode 4 is connected with a source of direct current indicated generally at 6, the wall of the chamber 3 constituting the other electrode. The potential on 6 should not be sufficiently strong to cause a sparking between the two electrodes or even of sufficient potential to cause a brush discharge therebetween. It is only necessary that a pronounced electrical field be set up, one of sufficient intensity to cause a migration to the electrodes of any electrified particles, or ions and electrons, subjected to the tension of the field therebetween. In actual practice I have found that a potential of several hundred volts is very effective.

Leading from the lower part of the chamber 3 is a pipe 7 which opens into a condenser 8. This condenser has pipes 9 therein, through which flows a cooling fluid, and is adapted to lower the temperature of the vapor carrying gas to a point below the condensation temperature of such vapor. In 8 condensation of the vapor into a liquid takes place and the liquid thus formed collects upon what condensation nuclei still are existent in the gas and upon the cool walls of the condenser and the pipes therein. The lower end of the condenser 8 is open and projects into a tank 10 which contains sufficient water to cover and thus seal it. Any liquid condensed on the walls or pipes of the condenser 8 runs down into tank 10 from which it may be removed in any desired way.

If desired, in addition to the condenser 8, separating apparatus may be used for further treating the gas after it has been passed through the condenser. For treating tar containing gas any desired tar extractor may be used, but I prefer that form illustrated in the drawing and which is such a one as described in my Patent No. 1,099,773, dated June 9, 1914. In this form of extractor the gas from the condenser passes through a pipe 11 which opens into one end of the cylinder 12 the other end of this cylinder being connected to a pipe 13 which is in turn connnected with the gas main. Located in the cylinder 12 is a pad or mat 14 of spun glass so arranged that any gas passing from the pipe 11 into the pipe 13, must pass through the meshes thereof, whereupon any liquid particles therein will be removed.

The carrying out of my method by means of the above described apparatus is as follows:

The gas from the producer having been generated from incandescent carbon contains a considerable number of ions capable of acting as condensation nuclei. This gas as it passes into the chamber 3 and there comes within the electrical field between the two electrodes is at a temperature sufficiently high to maintain the vaporization of any liquids carried thereby. As it comes within the influence of the electrical field the electrified particles therein move toward the electrodes and upon contacting therewith give up their electrical charges thus losing their capability of acting as condensation nuclei. At the same time it is found that varying portions of dust and other solid materials which might form nuclei in the condensation of the tar particles are also removed or precipitated. And after passing through the chamber 3 the gas will be found relatively free from electrified particles, and to a considerable extent also from solid particles, which means that a large number of possible condensation nuclei have been removed. The gas having been treated in this manner is passed into the condenser 8 where it is cooled and the vapor therein condensed. Since a great number of the condensation nuclei have been removed there will be formed a small number of large liquid particles rather than a large number of small particles, or fog. In fact the tendency in the condenser 8 will be for the greater portion of the liquid tar to collect on the cold surfaces of the pipes 9, without formation of a fog at all, and drain into the tank 10 whence it may be removed as desired. And what does not so collect will condense into particles of such substantial size that they may settle by action of gravity into the tank 10. In most instances this condensation in 8 will produce a sufficient degree of cleanness, but if, as stated above, it is desired to secure a greater degree of cleanness the gas may be passed through such an extractor as disclosed in the drawing at 12, which extractor will remove such of the tar particles as have not been already removed.

It is obvious that there is no deposition of tar, or other similar materials, in the chamber 3 since the temperature of the gas at this point is kept sufficiently high to avoid condensation. And this constitutes one of the most important improvements of this method over others purporting to obtain the same end, for the deionizing treatment takes place where there is no condensation of tar or other similar materials so that maintenance of insulation and prevention of coating of the electrodes are very easy. Further the electrical currents involved are, as compared to other processes of tar removal, very small and therefore subject to little danger in handling. Furthermore since these currents are of comparatively low potential no complicated or expensive apparatus for producing them is necessary.

This method is also a decided improvement over other methods of tar elimination since by removing the nuclei upon which fog is formed that phenomenon is prevented rather than cured and the necessity for elaborate or expensive apparatus for removing such tar fog is thus avoided. As stated above this method is by no means limited in its applicability to the removal of tar inasmuch as it is obviously capable of use with any vapor containing gas in which condensation nuclei exist. And it is also quite obvious that my invention is by no means limited to the apparatus disclosed herein for carrying that invention into effect, for it is quite apparent that many different forms of apparatus might be devised for thus removing from the vapor containing gases the condensation nuclei therein. My invention therefore resides in the broad idea of preventing the formation of a fog of finely divided liquids by removing a large number of the condensation nuclei from the vapor containing gas and then condensing that vapor so as to bring about its ready precipitation directly upon the wall of the condensation chamber, or to form particles of considerable size which can be thereafter easily removed by any desired means.

What I claim as new and desire to secure by Letters Patent is:—

1. The method of removing vapors from gases which consists in removing condensation nuclei therefrom and then condensing the vapors.

2. The method of removing vapors from gases which consists in subjecting the vapor containing gas to a deionizing agency and then condensing the vapors.

3. The method of removing vapors from gases which consists in subjecting the vapor containing gas to the action of an electrical deionizing agency and then condensing the vapors.

4. The method of removing vapors from gases which consists in decreasing the number of condensation nuclei therein, irrespective of any separation of discrete particles from the gas; and then condensing the vapor.

5. The method of removing vapors from gases which consists in passing the vapor containing gas through an electrostatic field of sufficient intensity to remove condensation nuclei, and then condensing the vapor.

6. The method of removing vapors from gases which consists in removing electrical condensation nuclei therefrom and then condensing the vapor.

7. The method of removing vapors from gases which consists in removing electrical condensation nuclei by electrical means and then condensing the vapor.

8. The method of removing vapors from gases which consists in removing condensation nuclei, then condensing the vapor, and then separating the condensed vapor from the gas.

9. The method of removing vapors from gases which consists in removing condensation nuclei by electrical means, then condensing the vapor, and then separating the condensed vapor from the gas.

10. In a gas purifying apparatus, the combination of a treating chamber having an inlet and an outlet therein; an electrode extending into said chamber and insulated therefrom; and means, associated with the electrode and the chamber, adapted to set up an electrostatic field of constant polarity within the said chamber, said means including a source of low potential undirectional current.

11. In a gas purifying apparatus, a treating chamber having an inlet and an outlet therein, means for setting up an electrostatic field in the chamber between the inlet and the outlet and a vapor condenser connected to the said outlet.

12. In a gas purifying apparatus, a treating chamber having an inlet and an outlet therein, an electrode in said chamber and insulated therefrom, means connected with said electrode for setting up an electrostatic field in the chamber and between the inlet and outlet thereof, and a condensing apparatus connected to said outlet.

13. A gas purifying apparatus comprising a treating chamber having therein electrical means for removing condensation nuclei from any vapor containing gas passing therethrough, and a condensing chamber adapted to receive any gas so treated.

14. A gas purifying apparatus comprising a treating chamber having therein means for removing condensation nuclei from any vapor containing gas passing therethrough, a condensing chamber adapted to receive any gas so treated, and an extracting apparatus adapted to receive such gas after it has passed through the condensing chamber and to remove condensed vapors not removed in the condensing chambers.

15. A gas purifying apparatus comprising a treating chamber having electrical means therein for removing condensation nuclei from any vapor containing gas passed therethrough, a condensing chamber adapted to liquefy any vapor contained in the gas so treated, and an extractor for removing the vapor so liquefied.

16. A gas purifying apparatus comprising a treating chamber, electrical deionizing means therein, a condensing chamber connected to the treatig chamber, and an extractor connected to the condensing chamber.

17. In a gas purifying apparatus; the combination of means for removing condensation nuclei from the gas, means for condensing substantially all vapor in the gas into drops of substantial size and means for removing from the gas such condensate.

In testimony whereof I affix my signature.

HARRY F. SMITH.